(12) United States Patent
Lautenschläger (10) Patent No.: US 8,436,869 B2
(45) Date of Patent: May 7, 2013

(54) METHOD FOR A REPRESENTATION OF IMAGE DATA FROM SEVERAL IMAGE DATA VOLUMES IN A COMMON IMAGE REPRESENTATION AND ASSOCIATED MEDICAL APPARATUS

(75) Inventor: Stefan Lautenschläger, Hausen (DE)

(73) Assignee: Siemens Aktiengesellschaft, München (DE)

( * ) Notice: Subject to any disclaimer, the term of this patent is extended or adjusted under 35 U.S.C. 154(b) by 716 days.

(21) Appl. No.: 12/231,414

(22) Filed: Sep. 2, 2008

(65) Prior Publication Data

US 2009/0058877 A1 Mar. 5, 2009

(30) Foreign Application Priority Data

Sep. 4, 2007 (DE) .......................... 10 2007 041 912

(51) Int. Cl.
*G09G 5/02* (2006.01)
*G06K 9/00* (2006.01)

(52) U.S. Cl.
USPC .......................................... 345/592; 382/128

(58) Field of Classification Search ............... 345/592; 382/128–131
See application file for complete search history.

(56) References Cited

U.S. PATENT DOCUMENTS

| | | | |
|---|---|---|---|
| 6,507,638 B2 * | 1/2003 | Curtis et al. ................. | 378/98.3 |
| 7,630,577 B2 * | 12/2009 | Yi et al. ........................ | 382/276 |
| 7,831,096 B2 * | 11/2010 | Williamson, Jr. ............. | 382/195 |
| 2002/0009224 A1 * | 1/2002 | Gatti et al. .................... | 382/154 |
| 2002/0090119 A1 * | 7/2002 | Saito et al. .................... | 382/128 |
| 2006/0154234 A1 * | 7/2006 | Winther et al. ................. | 435/4 |
| 2006/0187221 A1 * | 8/2006 | Lakare et al. ................. | 345/424 |
| 2007/0183644 A1 * | 8/2007 | Matsumoto .................... | 382/131 |

\* cited by examiner

*Primary Examiner* — Said Broome
*Assistant Examiner* — Peter Hoang (57) ABSTRACT

Method for the representation of image data from several image data volumes in at least one common image representation on an image display unit connected to a computer, in particular for the representation of medical image data, whereby in the or at least one image representation image data from at least one data volume which are to be assigned or have been assigned to different areas of the image representation are represented by the computer, at least in part, with reciprocally different opacity.

19 Claims, 4 Drawing Sheets

METHOD FOR A REPRESENTATION OF IMAGE DATA FROM SEVERAL IMAGE DATA VOLUMES IN A COMMON IMAGE REPRESENTATION AND ASSOCIATED MEDICAL APPARATUS

CROSS REFERENCE TO RELATED APPLICATIONS

This application claims priority of German application No. 10 2007 041 912.2 filed Sep. 04, 2007, which is incorporated by reference herein in its entirety.

FIELD OF THE INVENTION

The invention relates to a method for the representation of image data from several image data volumes in at least one common image representation on an image display device connected to a computer, in particular a method for the representation of medical image data, as well as to an associated medical apparatus.

BACKGROUND OF THE INVENTION

When recording image data it is often helpful, for example for establishing a diagnosis, as well as in the training of doctors and personnel working in the medical sector, such as technicians who operate image recording modalities, to produce not just one image data volume but several image data volumes. This offers the advantage that information can be used from several or, in the most frequent case, two different volumes. For example, images of cerebral vessels can be captured in a first recording as image data volume A while in a further recording of image data the surrounding tissue or surrounding structures are recorded as a volume B. The image data volume showing the vessels then makes it possible for example to detect narrowing (stenosis) or widening (aneurysm) of the vessels. The surrounding tissue or the surrounding structures of the second volume make it possible to spatially assign information from the first volume data record.

For an optimal assignment of the information from the two data records to each other it is desirable to have a visualization which shows the data from the two volume data records in a single representation. Using such a representation pathologies could be detected and at the same time a spatial localization could be made. This has prompted attempts to visualize the two volume image data records in a merged representation, for which a certain fixed mixture ratio is set for the data from the two volumes. The problem is, however, that under certain circumstances some details of a first image data volume, which are important for example for making a diagnosis, are concealed by information from the second image data volume, which for example serves the purpose of spatial orientation. This can in certain circumstances lead to considerable deficiencies in the usability or the evaluation of the image data.

SUMMARY OF THE INVENTION

The invention therefore derives from the task of providing a method which is better in this respect.

To solve this task, aspects of the present invention may involve a method for the representation of image data from several image data volumes in at least one common image representation on an image display device, as may be connected to a computer. The method may be effective for the representation of medical image data. At least one image data volume may contain one or more areas having a selectable opacity.

In accordance with the invention a fixed mixture ratio is therefore not specified for the representation of the two volumes or several volumes and the representation is effected in such a way that for at least one image data volume the opacity, at least in one partial area of the volume or in only one point, but generally in a larger area, differs from the opacity in the rest of the image area. Also, the opacity in a certain area, for example in the middle of the image, can exhibit a fixed different value than in the rest of the image, or the opacity can be varied in several areas of the image representation. In particular, the opacity can be varied starting from a certain area or a certain point of the image representation, for example by a constant increase or decrease, possibly to a certain limit value or an image area boundary.

In this connection it is advantageous if the opacity of the second or of the other image data volumes is likewise varied, for example inversed, in adaptation to the change in opacity of the first volume.

Opacity is used here as a measure of the non-transmission of light. As opacity is the reciprocal of transmission, the transmission or transparency of the image data volume is also changed according to the variation in opacity. This is covered by the method in accordance with the invention, even though a variation in opacity is primarily dealt with below. The method therefore relates to the evaluation of the image data of multi-dimensional image data volumes to be regarded as physical data in such a way that from the image information of the various volume recordings, which for example were made using different recording equipment, a suitable or evaluatable image is obtained by means of the method in accordance with the invention.

The method thus relates to image data processing with the purpose of integrating the image data from different volumes in a common image representation or a common image. This image is then displayed on a display device, for example a screen, a monitor and the like, but can also initially be merely stored for later use. In particular, the actual representation can take place subsequently to processing in order to determine the varying opacities. In this case an image data record is therefore initially determined which has been expanded to such an extent that the suitable opacity values found have been assigned to the image data. This image data record then permits a subsequent optimized representation of the data with varying opacity in accordance with the invention.

In accordance with the invention several, in particular two, image data volumes which are registered with each other can be represented. The most frequent example will be the representation of two image data volumes, for example a representation of internal vessels or bone structures and of a surrounding area of tissue or the skin, in order to permit localization or spatial assignment. It is, however, also conceivable for several, for example three or four, image data volumes to be recorded and evaluated and represented in accordance with the invention. To facilitate a problem-free representation and assignment of the image data, it is advantageous for the image data volumes to be registered with each other, as only thus can a correct assignment of the data be ensured.

In connection with fixing (e.g., configuring) the opacity of an image representation for image data from at least one image data volume, at least one interesting point and/or area can be determined in the image data volume and/or in at least one image representation, such as automatically by the computer or in response to inputs by an operator. When reference is made to an opacity for the image data, it should be appreciated that this refers to the opacity to be used for a desired image representation for the image data.

The invention therefore makes it possible to vary the opacity specifically with regard to areas or points in one of several image volumes which are, for example, particularly important for making a diagnosis. This can happen in such a way that the computer, which incidentally can also at the same time be a control unit for an image recording unit, using suitable programs such as image processing programs, which permit edge detection or pattern recognition or a comparison with anatomical databases and the like, identifies a relevant area ("region of interest") or a relevant point ("point of interest") in the image data volume, starting from which the opacity or transparency of the image data representation can be varied in such a way that the representation in this area is optimal for subsequent evaluation.

Furthermore, interesting or also critical areas and regions can be determined manually by an operator, who for example clicks on a point in a representation using a mouse, which point is then represented with a maximum or minimum opacity for example for a volume but under certain circumstances also for several volumes.

It is also conceivable for this selection of one or several interesting points or areas in the volume or in an image representation to be made fundamentally by the computer, for example by it making a suggestion. An operator can then confirm the selection or change it by making a finer selection.

Particularly advantageously, image data from at least one image data volume are represented with at least fundamentally increasing or decreasing opacity starting from at least one interesting point and/or area. This means that for example a particularly relevant point is selected e.g. by an operator, at which point a volume is represented with maximum opacity, i.e. is non-translucent, whereby in the representation plane the representation is varied in such a way starting from this point that the opacity gradually decreases as the distance from this point becomes greater. Conversely, a point or an area can be represented with a minimum opacity, starting from which the opacity increases, possibly in all directions or at least marked directions. This increase can be a straight increase, i.e. it can take place unvaryingly or continuously, or it can be an increase or decrease which fundamentally takes place in such a way that the opacity remains unchanged (plateaus are formed) in small areas, although the distance to the interesting point changes, or that the opacity in a certain area changes in a different direction from the direction mainly envisaged, e.g. decreases instead of increases. These subtleties can be specified by the computer or by an operator in order to further optimize the representation.

The opacity can be fixed for image data from at least one image data volume by specifying at least one opacity profile, in particular by specifying at least one opacity profile referred to a distance from an interesting point or an interesting area.

Such a profile sets how the opacity and, correspondingly, the transparency or transmission should behave for example in the area of the image plane or also multi-dimensionally in the representation. Accordingly, curved profiles or profiles as two-dimensional or higher-dimensional representations can be specified which set the associated opacity value for a certain point in the image plane or in the volume. In particular, a profile can be formed in such a way that the opacity value is set as a function of the distance from an interesting point or from an interesting area with a maximum or minimum opacity or merely with an opacity fixed in a certain way. The curve shapes or profile shapes are variable as desired and can be changed by a user, if appropriate on the basis of certain specifications of suitable or recommendable profiles made by the computer or a computer program equipped for this purpose with a data collection of corresponding profile shapes.

The opacity of at least one or of the image representation can be fixed for image data from at least one image data volume by specifying at least one opacity profile providing for a change in opacity up to a certain distance from at least one interesting point or area and/or an opacity profile increasing or decreasing continuously or in stages at least fundamentally and/or at least to a certain value.

The opacity can therefore be changed in such a way that an interesting point is determined, starting from which the opacity continuously increases until a maximum value is reached. Alternatively, starting from such a point the opacity can continuously decrease until at a certain distance from the point a desired minimum opacity is reached. In principle it is also conceivable for the opacity not to continuously increase or decrease but e.g. to be varied in stages, although the case of a continuous increase or decrease as a rule will be most suitable for obtaining informative image representations.

The maximum value of the opacity does not necessarily have to be 100%. Likewise, the minimum value does not have to be 0%. The key factor when fixing the values is merely how the best-possible presentation or evaluation of data can be achieved for several image data volumes. It can, however, be appropriate, for example for an image data volume showing vessels, to specify an opacity of 100% in a particularly relevant area which then away from the relevant area, for example from the middle of the image, gradually decreases to 0%, so that for example the image data from a volume showing the surrounding skin structure can be seen clearly around the edge, which facilitates localization and spatial orientation.

At least one opacity profile for image data from at least one image data volume or for a corresponding image representation can be determined as a function of at least one opacity profile from at least one further image data volume, in particular by inversion on a vertical axis of a characteristic describing an opacity profile and/or, at least fundamentally, by reversing the course of the opacity profile of at least one further image data volume. As already described, the first and further opacity profile can be determined by the computer or control unit and/or by an operator.

In particular a characteristic of a profile of a further image data record can be created as standard by inverting the characteristic for the first image data record on a vertical line. If the characteristic is structured in such a way that the opacity is changed up to a certain maximum distance from an interesting point, it is recommendable to make the inversion on a vertical line halfway along this distance. From this the characteristic of the further data record or, as the case may be, for several further image data volumes can be ascertained. Such an approach to determining opacity profiles or transparency profiles on the basis of fixed specifications is, however, merely to be understood as an example. In general the opacity profile for a certain image data volume of already determined opacity profiles or characteristics can be selected independently and as desired for the image data volume or the several other image data volumes.

Particularly advantageously at least one opacity profile can be a two- or higher-dimensional opacity profile, in particular a, with regard to a representation plane, depth-dependent higher-dimensional opacity profile. Opacity profiles can, therefore, be used which not only consist of a characteristic for a certain distance from an interesting point or area in a representation plane or screen plane but which in further dimensions also provide for a change in opacity. Thus, depth information of an image data record can, for example, be used for orientation, whereby then at the same time by suitable variation of the opacity a concealment of information from a different volume can be prevented. In such opacity profiles with more than three dimensions or corresponding transparency profiles the associated transparency and opacity values in one image data volume are therefore not necessarily the same in each parallel section (referred to the screen plane), but can be varied as desired.

In particular, as at least one opacity profile a two-dimensional opacity profile with a circular or elliptical or polygonal two-dimensional surface in each case having the same opacity values or a three-dimensional opacity profile with, in each case with regard to the same opacity values, a conical shape or cylindrical shape or cuboid shape or parallelepiped shape or polyhedral shape or a body with, at least in part, bent surfaces can be used.

The opacity profiles can thus for example be shaped two-dimensionally in such a way that in each case two circles with a same center derive on which the opacity or the transparency has the same value. In the same way other two-dimensional opacity profiles with for example elliptical shapes having the same opacity or transparency values can be provided, in which case the selection of the suitable shape depends, among other things, on the structure to be represented.

In addition, it is possible to specify opacity profiles three-dimensionally. In this case the areas having the same opacity can lie on a cone, a cylinder (this would e.g. correspond to a two-dimensional circular profile in the screen plane, from which the same path is followed in the depth in each case) or a cuboid and the like. It is, of course, not absolutely necessary to have such a regular geometrical shape and any three-dimensional shapes and profiles desired can be specified, in the individual case even so that each point is assigned an opacity value in the volume data record without a certain body being specified as the basic shape. As a rule, however, the use of certain basic shapes is recommendable because in this case associated opacity paths can be realized in the image representation with relatively little computational effort and, furthermore, such a representation matches what a viewer is used to seeing.

At least one opacity profile can be determined by the computer, in particular automatically or with assistance from an operator, or freely by an operator. An opacity profile can therefore be specified completely automatically by the computer. If necessary, following such a specification a change or confirmation by an operator is possible. Furthermore, it is conceivable for the opacity profiles to be specified completely freely by an operator, for example using a corresponding operating tool the operator can insert or draw a desired geometrical shape for an opacity profile in an initial merged representation of the two image data volumes with a constant mixture ratio.

In principle the opacity profiles and transparency profiles can be determined or adjusted as desired to achieve the best representation possible. For effective realization it is, however, expedient to specify certain particularly suitable profiles which can then be varied by a user.

In accordance with the invention at least one image data volume can be represented with image data to be assigned to bones and/or vessels of an image recording area and/or at least one image data volume with image data which in relation to the image data from a first and/or further image data volume are to be assigned to surrounding structures, in particular skin structures and/or tissue structures. As a rule, at least one image data volume will show internal (concealed or not externally visible) vessels or structures and a further image data volume recorded with a different resolution range or by a different modality will show surrounding structures which can serve the purpose of spatial orientation, for example the skin or surrounding tissue and the like. Bone structures (not recognizable externally) can, of course, also represent surrounding tissue, for example with regard to vessels or a tumor.

In addition, at least two image data volumes recorded with different contrasts can be represented, in particular at least one image data volume recorded with a high contrast and at least one image data volume recorded with a low contrast for the purpose of spatial orientation and/or localization. The high-contrast recording is preferably a recording which can be evaluated for making a diagnosis or for assessing treatments and the like. For example, the high-contrast recording can show pathological areas in the body. The additionally provided low-contrast recording or the recording exhibiting an at least slightly lower contrast then for example shows surrounding structures which simplify spatial orientation and for which a lower contrast suffices. The representation of high-contrast data for relevant structures or vessels together with low-contrast data which for example show externally visible structures such as the skin makes it possible for example to plan more precisely and conduct surgical interventions and incisions.

Under the method in accordance with the invention image data from at least one, in particular several, three- or more than three-dimensional image data volumes can be represented. In particular it is also conceivable for image data volumes to be represented which were recorded over a certain time and which thus exhibit a time component, for which an opacity profile that changes over the course of time can also be applied.

Furthermore, under the method several image data volumes can be recorded using at least one medical apparatus for recording images. A medical apparatus is therefore used which is configured for recording image data, possibly with different methods and modalities, in order to record image data which subsequently as part of evaluation can be represented in an optimized form with varying transparency or opacity. Here it may be expedient to use an integrated medical apparatus which is configured for recording images with several methods.

In addition, several recorded image data volumes can be aligned against each other, in particular using at least one merged representation, by the computer or by an operator. This enables an operator, in particular in a representation which already shows both or all recorded image data volumes, to rotate them as desired, to zoom into them, to pan etc., in order to align them suitably, so that an optimal evaluation or further use of the image data is possible. For example a technician or scientist controlling the preparation of the image recordings can perform an alignment in such a way that subsequently the use of the image recordings which have been reworked with regard to the opacity values is optimally possible for a doctor, e.g. in order to make a diagnosis.

A work procedure in accordance with the invention can therefore be such that initially two at least three-dimensional data records are recorded which, if this has not already been carried out by the recording modality, are registered with each other. Furthermore, a merged representation of the two image data volumes or data records is optionally possible. This can be followed by an alignment of the data records as described above. An interesting point or area can then be marked in the representation or generally, whereby an interesting point can be represented in a subsequent visualization with maximum opacity (with maximum transparency of the other data record).

The interesting point can be the image center point or also a point which was determined by a computer or the operator on the basis of the shown structures or the image content. Then a suitable transparency or opacity profile is selected for the two data records, automatically or by an operator. Next the two data records can be represented taking these transparency or opacity profiles into account. The profiles can e.g. have the same or constant values in each depth (parallel to the screen plane), or depth-dependent profiles can be specified. If now a further change in the representation is made, for example a rotation, the superimposed representation is recalculated according to the transparency or opacity profiles applied. Expediently, the profiles always relate to the screen plane, not to the data records as such.

In addition, the invention relates to a medical apparatus configured for the representation of image data from several image data volumes, in particular recorded using the medical apparatus, in at least one common image representation on an image display device connected to a computer of the medical apparatus, in particular in accordance with a method as described above, whereby the computer is configured for the representation, in the or at least one image representation, of image data from at least one image data volume which are to be assigned or have been assigned to different areas of the image representation with, at least in part, reciprocally different opacity.

The medical apparatus is thus for example an apparatus with which image data, possibly obtained by different image recording methods, for example computer tomography data or magnetic resonance data or also camera recordings (e.g. of the skin surface), can be prepared which can then be represented together as physical-technical data, for which purpose the medical apparatus incorporates a computer to which these image data are sent and which then, using suitable programs, produces a representation in which the data from the two or several image data volumes are represented together in such a way that at least the opacity of one of the two or several volumes is not uniform over the entire representation area but exhibits different values. Image data are therefore represented which belong to different points or point areas of the representation, at least in part, with varying or different opacity (and correspondingly different transparency).

BRIEF DESCRIPTION OF THE DRAWINGS

Further advantages, features and details of the invention are reflected in the following exemplary embodiments and in the drawings which are as follows.

DETAILED DESCRIPTION OF THE INVENTION

Figure 1:
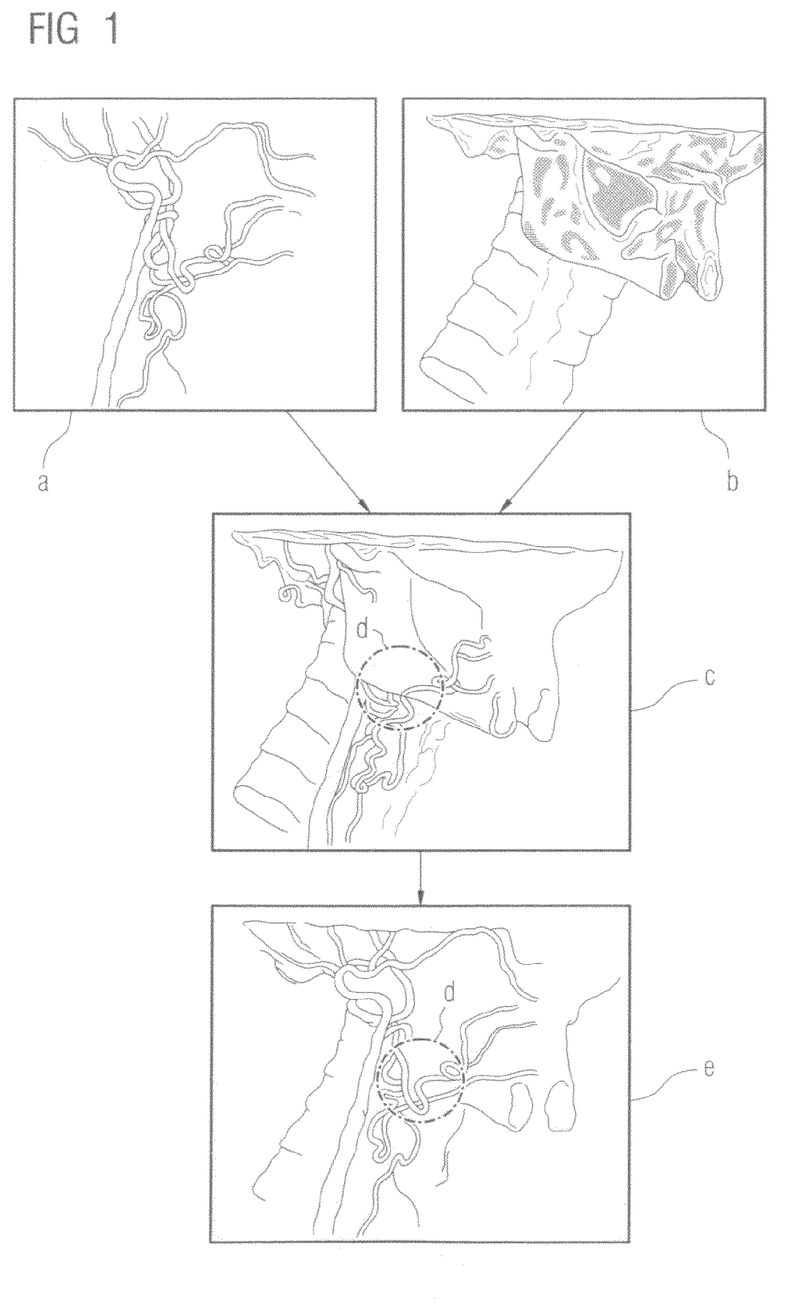
FIG. 1 shows a representation for the performance of a method in accordance with the invention.

FIG. 1 shows a representation for the performance of a method in accordance with the invention, whereby, as presented in box a, initially a high-contrast recording of an artery leading to the brain is made. As presented in box b, a second volume data record is also recorded with a low contrast which shows surrounding structures, in this case bone structures in the area of the skull or the spinal column.

As indicated by the arrows leading to box c, from these two image data records or image data volumes a merged image representation is produced which shows the two image data volumes with a constant mixture ratio. Such a representation is not absolutely necessary for the method in accordance with the invention, but can be produced for example to enable an operator to rotate the image data records suitably in order to obtain a desired view or to facilitate subsequent evaluation, or to change them in some other way with regard to the alignment or view. A disadvantage of the merged representation as in box c is that for example a localization of the pathology in the area of the artery as in box a is rendered more difficult by the fact that certain areas of the artery path, i.e. certain details of the image data volume as in box a, are concealed by bone structures of the image data record as in box b. This is particularly the case in the area of the shadow of the jaw bone, which is highlighted as a partial area here by circle d. In this area the artery path is concealed to a large extent by the jaw bone.

To prevent this, a representation in accordance with the invention is produced as in box e, in which the data record of box b, which shows the bone structures in the surrounding area, exhibits a high transparency in the area of the circle d, while at the same time in this area of the circle d the data record of box a, which is assignable to the arteries, is particularly opaque, so that this detail stands out clearly in the representation. The opacity can, as is here the case, exhibit a fixed (compared with the rest of the image representation higher) value in the entire area d marked by the circle. Also in a further circular area around the area d the opacity still exhibits a high value at increased transparency of the bone representation. It is, however, also conceivable for the opacity within the area of the circle d or into further areas of the image to be varied more or less steadily, for example by a corresponding continuous increase in the opacity of the volume as in box a and a corresponding decrease in the opacity of the volume as in box b.

The representation and evaluation method in accordance with the invention for the physical image data offers the advantage that several, in this case two, data records can be optimally superimposed in the representation, so that if any pathologies exist they are visible as image data of an image data record without being affected by outside influences. The orientation information which in FIG. 1 derives from the image data record as in box b can nevertheless continue to be optimally deployed or inserted.

For selection of a (particularly) interesting area, e.g. the area as in circle d, the area can simply be highlighted using the mouse. The associated transparency or opacity profile as well as its maximum radius (and maximum distance to an interesting point or area) can then be set by the operator using a corresponding program on a computer. This for example permits a visualization and representation for training purposes, including to show trainee doctors structures, vessels and the like inside the body together with externally visible or surrounding structures.

Figure 2:
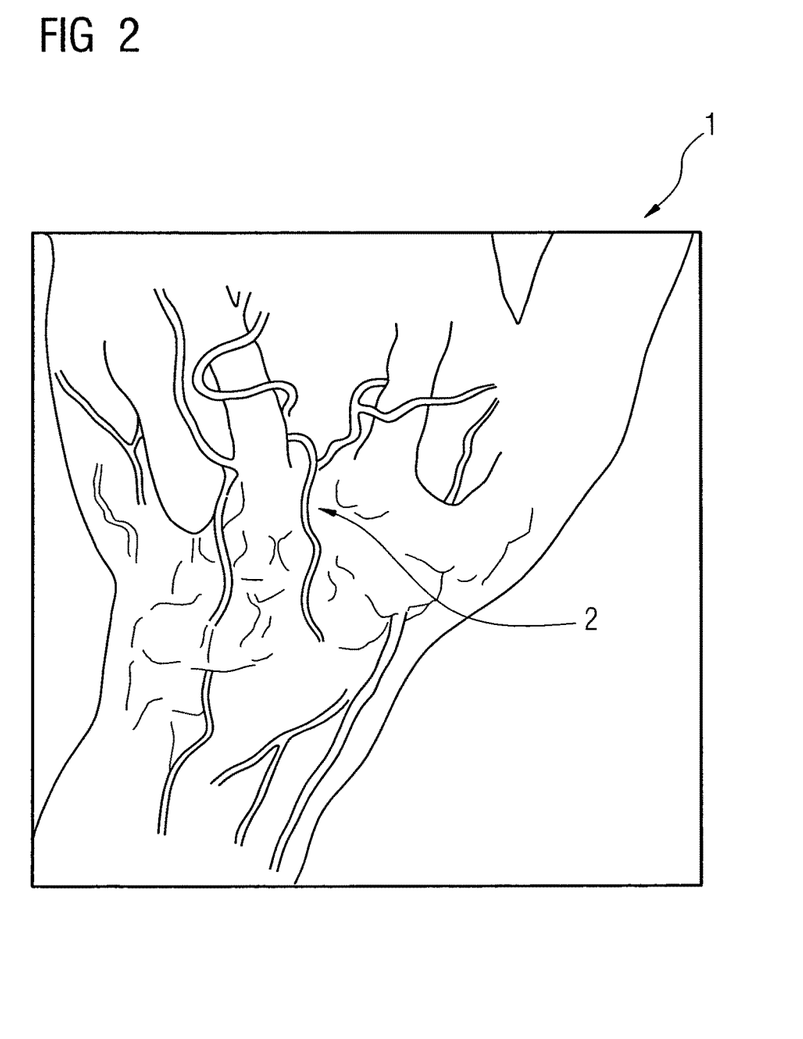
FIG. 2 shows an image representation obtained using a method in accordance with the invention.

FIG. 2 shows an image representation 1 obtained using a method in accordance with the invention. This image representation 1 shows two different image data volumes, namely one image data volume with image information relating to the bones and vessels in the hand of a patient, and another image data volume which shows the skin as an externally visible structure. The image data volume with the information relating to the bones and the vessels exhibits a maximum opacity in a middle area 2 which decreases towards the edge of the image concentrically in a circular fashion (the areas having in each case the same opacity are therefore circles with the same center). The volume showing the skin shows a correspondingly inverted behavior, so that here the transparency in the middle of the image is the maximum and it decreases towards the edge of the image, likewise in a circular fashion. With this type of representation pathologies to be found in the image data of the volume showing the bones and vessels can be viewed unfiltered in the area in focus, e.g. the middle of the image, i.e. (at least fundamentally) without superimposing image data from the second volume. At the same time the image data from the second volume, which in this case shows the skin, make it possible to achieve optimal orientation.

Figure 3:
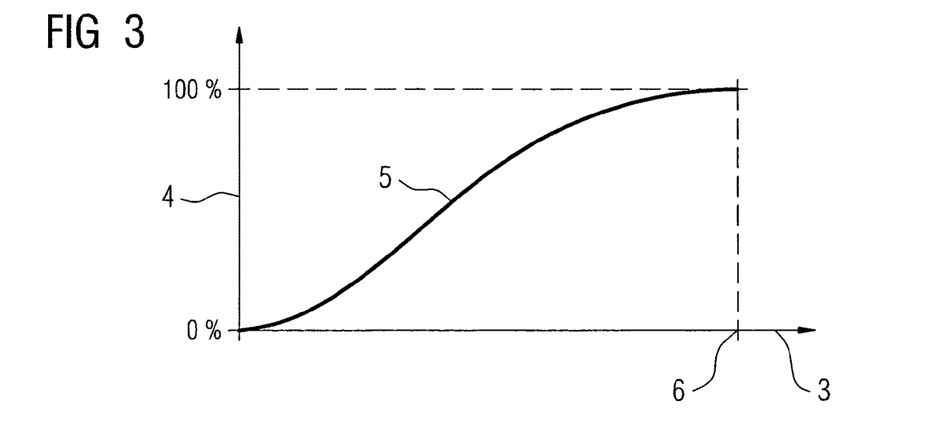
FIG. 3, 4 and 5 show characteristics of possible opacity profiles.
Figure 4:
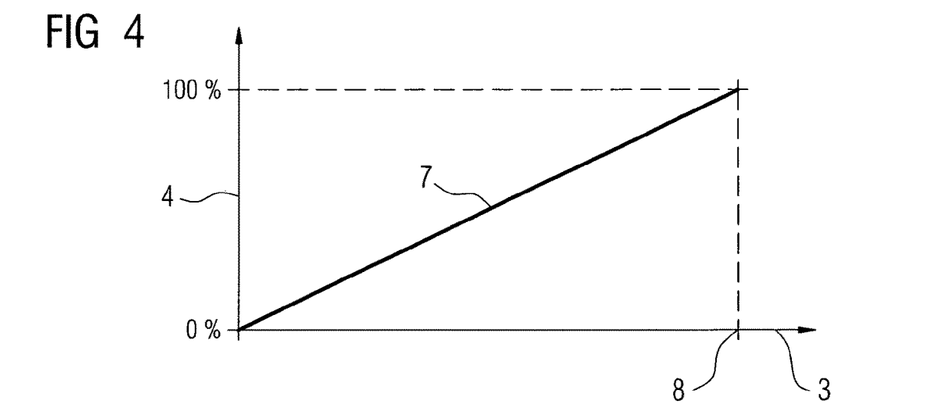
Figure 5:
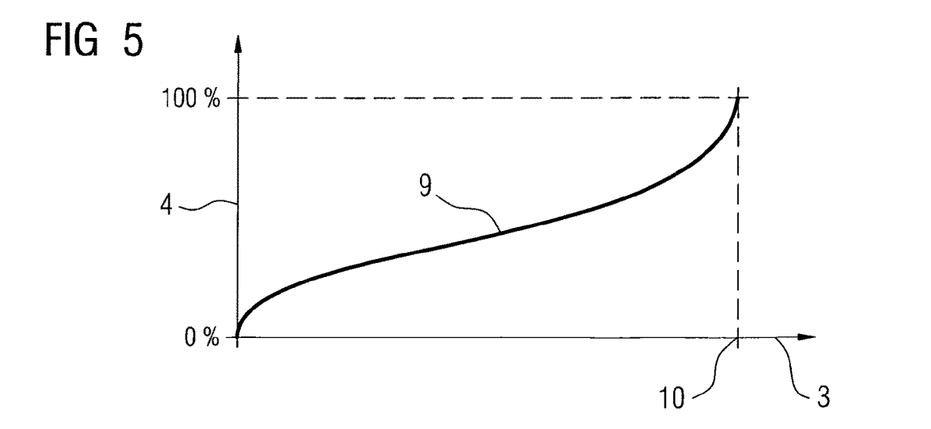

FIG. 3, 4 and 5 show characteristics of possible opacity profiles. In each case on the x-axis 3 the distance from an interesting point is inserted as fixed by an operator, while on the y-axis 4 the opacity is represented in %.

The characteristic 5 of FIG. 3 shows the case where the opacity at an interesting point amounts to 0% and then starting from this point it rises continuously in the shape of curve 5 to an opacity value of 100%, which is to be assigned to a maximum distance or radius from the interesting point in accordance with value 6 on the x-axis 3. The behavior is distance-dependent and the characteristic or curve 5 is to be understood in such a way that the distance from the interesting point relating to the screen plane is viewed. The depth is not taken into account. Even at greater distances than the maximum distance the opacity value remains at 100%.

It is likewise feasible for the opacity to follow the characteristic 7 in FIG. 4, therefore once again to rise from an opacity value of 0% to an opacity value of 100% at a maximum distance 8, but now on a linear path. In the areas which exhibit a greater distance than the maximum distance 8 to the interesting point the opacity is then likewise set at 100%. This does not necessarily have to be the case, however, because in particular the opacity can decrease again if there is another interesting area in the image. For many image representations half the image width can be a suitable value for the maximum distance 8. It is, however, just as conceivable to select any other values desired for the maximum distance, for example with regard to how big the proportion of the image data is which are referred in the volume to one pathology.

A further opacity profile is specified by the characteristic 9 in FIG. 5, according to which the opacity once again increases from a value of 0% initially very steeply and then more flatly and which finally in the area of a maximum distance 10 again rises steeply to the opacity value of 100%. This characteristic 9 therefore has the effect that the opacity even in an area of the image which is very close to the interesting point exhibits a value which is recognizably different from 0. This can be desirable for example when the orientation, even in the area of one pathology, needs to be safely guaranteed. In the areas of the image which exhibit a greater distance than the maximum distance 10 from the interesting point, the opacity is at a constant 100%.

It is, of course, just as conceivable for the opacity to exhibit such a path that the maximum value is not assumed until an image edge in (at least) one direction has been reached. Likewise, other curves or characteristics than the continuously rising curves or characteristics 5, 7 or 9, can be used, in particular also characteristics which exhibit plateaus or which change the direction of the path and/or change themselves in stages.

Expediently, the opacity behavior of an image data record may be adjusted relative to the opacity behavior of another image data record. For example, the opacity curves or characteristics 5, 7, 9 respectively shown in FIGS. 3-5 can be inverted on a vertical axis halfway along the maximum distance 6, 8 and 10 to obtain the opacity profile of a second data record. For example, upon inversion, in lieu of having 100% opacity in the interesting area, one may have an opacity of 0%.

Figure 6:
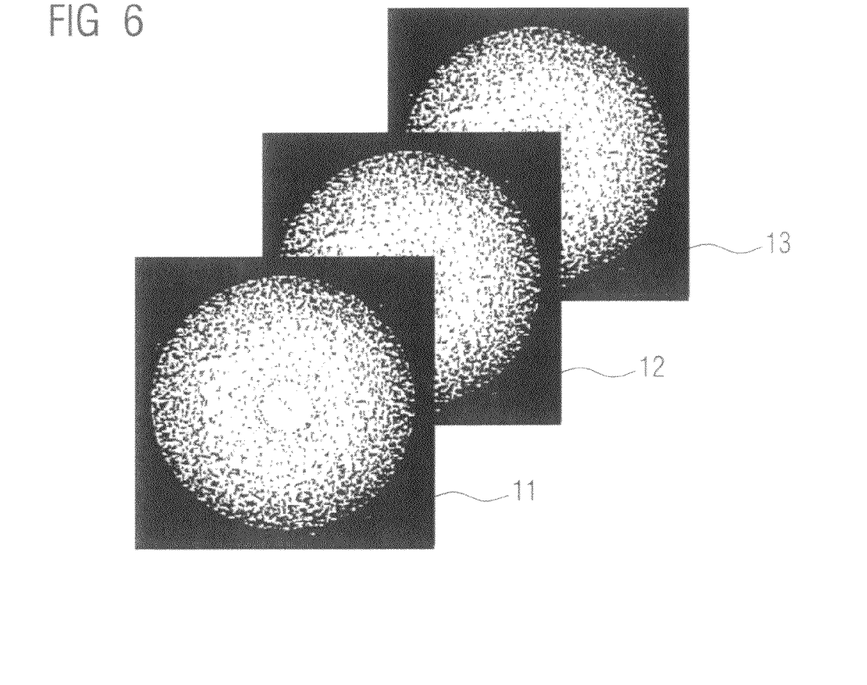
FIG. 6 shows a representation relating to an opacity profile unchanged over the depth of the image data volume.

FIG. 6 shows a representation for an opacity profile which is unchanged over the depth of the image data volume. The sectional views 11, 12 and 13 in each case show opacity paths at different depths of an image data volume, i.e. at different depths referred to a screen plane. The opacity profile applied here exhibits a circular basic shape, i.e. areas of the same opacity in each case lie on a circular line. The opacity profile in accordance with the sectional views 11, 12, 13 is referred in depth to the screen plane and therefore is shaped in the same way in all planes which are parallel to the current screen plane.

Figure 7:
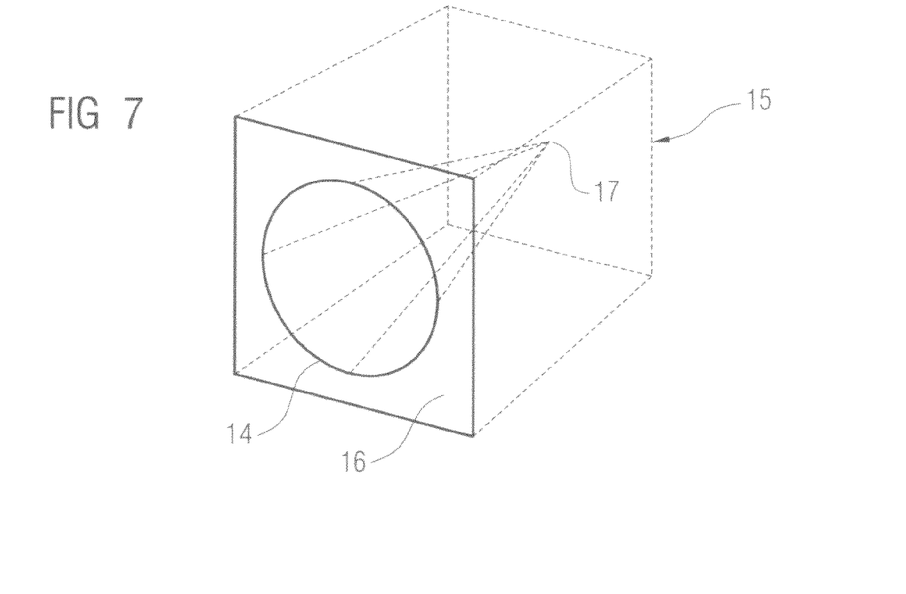
FIG. 7 shows an example of a three-dimensional opacity profile.

By contrast, FIG. 7 shows an example of a three-dimensional opacity profile 14, which is represented here in a surrounding image volume 15. A three-dimensional surface of the opacity profile 14 is shown here to which in each case the same opacity values are assigned. The opacity profile 14 is shaped as a three-dimensional cone whose base lies in a screen plane 16 of the representation and whose tip 17 projects into the image plane.

The application of such a three-dimensional opacity profile 14 or of a comparable three-dimensional opacity profile makes it possible to use lower-lying information of an image data volume which primarily serves the purpose of orientation or localization, without there being any risk that the other image data volume or the several other image data volumes will be concealed with regard to the relevant image data information in these other volumes. Accordingly, the multidimensional, i.e. three- or higher-dimensional transparency or opacity profile can, depending on the content of the image data, exhibit extremely different suitable or optimized shapes.

The invention claimed is:

1. A method for representing image data of a patient, comprising:
   acquiring with at least one image recording device at least a first image data volume and a second image data volume of the patient;
   acquiring the first image data volume by way of a first imaging modality of said at least one image recording device, wherein the first image data volume acquired by way of the first imaging modality of said at least one image recording device comprises physical data indicative of varying opacity values of the first image data volume as physically recorded by way of said first imaging modality of said at least one image recording device;
   configuring the first imaging modality to image a vessel or structure of the patient;
   acquiring the second image data volume by way of a second imaging modality of said at least one image recording device, wherein the second image data volume acquired by way of the second imaging modality of said at least one image recording device comprises further physical data indicative of further varying opacity values of the second image data volume as physically recorded by way of the second imaging modality of said at least one image recording device, wherein one of the first and second imaging modalities magnetic resonance imaging;
   configuring the second imaging modality to image a surrounding structure relative to the vessel or structure imaged by the first image data volume;
   processing at least a portion of at least one of the first and second image data volumes with a selectable opacity, wherein the selectable opacity is configured to optimize a visualization of a spatial relationship of the vessel or structure relative to the surrounding structure, the visualization at least in part optimized to avoid an image obscuration of the vessel or structure by the surrounding structure;

registering the first data volume with respect to the second data volume; and displaying a common image representation of the first and second data volumes, wherein the common image representation is effective to determine a spatial arrangement of the vessel or structure relative to the surrounding structure without obscuration of the vessel or structure by the surrounding structure based on the optimized visualization of the vessel or structure relative to the surrounding structure.

2. The method as claimed in claim 1, wherein the image data volumes are registered with each other.

3. The method as claimed in claim 1, wherein an interesting point is determined in at least one of the first and second image data volumes.

4. The method as claimed in claim 3, wherein the opacity is increased or decreased starting from the interesting point.

5. The method as claimed in claim 4, wherein the opacity is fixed by specifying an opacity profile that is referred to a distance from the interesting point.

6. The method as claimed in claim 5, wherein the opacity profile changes the opacity up to a certain distance from the interesting point.

7. The method as claimed in claim 5, wherein the opacity profile increases or decreases the opacity continuously up to a certain value.

8. The method as claimed in claim 5, wherein the opacity profile increases or decreases the opacity in stages up to a certain value.

9. The method as claimed in claim 5, wherein the opacity profile is determined as a function of a further opacity profile from a further image data volume of the image data volumes by:

inverting a characteristic of the further opacity profile on a vertical axis, or reversing a course of the further opacity profile.

10. The method as claimed in claim 5, wherein the opacity profile is a two-dimensional or a higher-dimensional opacity profile, and wherein the higher-dimensional opacity profile is a depth-dependent higher-dimensional opacity profile with regard to an representation plane.

11. The method as claimed in claim 5, wherein the opacity profile comprises a two-dimensional surface having same opacity value, and wherein the two-dimensional surface is selected from the group consisting of: a circular, an elliptical, and a polygonal.

12. The method as claimed in claim 5, wherein the opacity profile comprises a three-dimensional shape having same opacity value, and wherein the three-dimensional shape is selected from the group consisting of: a conical, a cylindrical, a cuboid, a parallelepiped shape, a polyhedral, and a shape with a bent surface.

13. The method as claimed in claim 5, wherein the opacity profile is determined automatically by a computer or by the computer in response to inputs of an operator.

14. The method as claimed in claim 1, wherein the structure being surrounded is a bone.

15. The method as claimed in claim 1, wherein the surrounding structure comprises a skin structure, a bone or a tissue structure.

16. The method as claimed in claim 1, wherein the image data volumes are recorded with differing contrasts for a spatial orientation and localization.

17. The method as claimed in claim 1, wherein at least one of the image data volumes is a three-dimensional image data volume or more than a three-dimensional image data volume.

18. The method as claimed in claim 1, wherein at least several of the image data volumes are aligned against each other by a merged image representation.

19. A medical apparatus, comprising:

at least one image recording device that records at least a first image data volume and a second image data volume in an image representation of a patient, the first image data volume acquired by way of a first imaging modality of said at least one image recording device, the first imaging modality configured to image a vessel or structure of the patient, the second image data volume acquired by way of a second imaging modality of said at least one image recording device, the second imaging modality configured to image a surrounding structure relative to the vessel or structure imaged by the first image data volume, wherein the first image data volume acquired by way of the first imaging modality of said at least one image recording device comprises physical data indicative of opacity values of the first image data volume as physically recorded by way of said first imaging modality of said at least one image recording device, and further wherein the second image data volume acquired by way of the second imaging modality of said at least one image recording device comprises further physical data indicative of further opacity values of the second image data volume as physically recorded by way of the second imaging modality of said at least one image recording device, wherein one of the first and second imaging modalities comprises magnetic resonance imaging;

a computer configured to process at least a portion of at least one of the first and second image data volumes with a selectable opacity , wherein the selectable opacity is configured to optimize a visualization of a spatial relationship of the vessel or structure relative to the surrounding structure, the visualization at least in part optimized to avoid an image obscuration of the vessel or structure by the surrounding structure, wherein the computer is further configured to register the first data volume with respect to the second data volume to generate a common image representation; and a display device that displays the common image representation of the first and second data volumes, wherein the common image representation is effective to determine a spatial arrangement of the vessel or structure relative to the surrounding structure without obscuration of the vessel or structure by the surrounding structure based on the optimized visualization of the vessel or structure relative to the surrounding structure.

* * * * *